United States Patent [19]
Lee

[11] Patent Number: 6,046,618
[45] Date of Patent: Apr. 4, 2000

[54] PHASE CORRECTION CIRCUIT AND METHOD THEREFOR

[75] Inventor: Myeong-hwan Lee, Suwon, Rep. of Korea

[73] Assignee: Samsung Electronics Co., Ltd., Kyungki-do, Rep. of Korea

[21] Appl. No.: 09/009,124

[22] Filed: Jan. 20, 1998

[30] Foreign Application Priority Data

May 12, 1997 [KR] Rep. of Korea ............... 97-18328

[51] Int. Cl.$^7$ .................................................. H03H 3/00
[52] U.S. Cl. .................................... 327/236; 327/3; 327/7
[58] Field of Search .................................. 327/238, 3, 7, 327/12, 236, 254; 375/371, 326

[56] References Cited

U.S. PATENT DOCUMENTS

| | | | |
|---|---|---|---|
| 3,829,779 | 8/1974 | Fujimoto | 325/38 A |
| 3,872,381 | 3/1975 | Yamamoto et al. | 325/42 |
| 5,353,069 | 10/1994 | Kobo | 348/611 |
| 5,406,587 | 4/1995 | Horwitz et al. | 375/346 |
| 5,706,057 | 1/1998 | Strolle | 348/426 |
| 5,798,803 | 9/1998 | Limberg | 348/726 |

FOREIGN PATENT DOCUMENTS

| | | |
|---|---|---|
| 48-82710 | 11/1973 | Japan. |
| 48-33711 | 12/1973 | Japan. |
| 53-58753 | 5/1978 | Japan. |
| 54-64959 | 5/1979 | Japan. |
| 59-198052 | 11/1984 | Japan. |
| 62-180634 | 8/1987 | Japan. |
| 2-41049 | 2/1990 | Japan. |
| 6-216953 | 8/1994 | Japan. |
| 4-65946 | 3/1996 | Japan. |
| 8-340359 | 12/1996 | Japan. |
| 9-261285 | 10/1997 | Japan. |

*Primary Examiner*—Timothy P. Callahan
*Assistant Examiner*—Hai L. Nguyen
*Attorney, Agent, or Firm*—Sughrue, Mion, Zinn, Macpeak & Seas, PLLC

[57] ABSTRACT

A phase correction circuit for correcting an antiphase component of a one-dimensional input signal is provided. The circuit contains a phase tracker, an antiphase detector, and an antiphase corrector. The phase tracker detects a decision error in the one-dimensional input signal having a phase error and outputs a phase-corrected signal in response to the decision error. The antiphase detector detects whether or not the phase-corrected signal is in antiphase and outputs a corresponding phase control signal. The antiphase corrector corrects a phase of the phase-corrected signal in accordance with the phase control signal. A method for performed by the phase correction circuit is also provided.

34 Claims, 5 Drawing Sheets

PHASE CORRECTION CIRCUIT AND METHOD THEREFOR

FIELD OF THE INVENTION

The present invention relates to the phase correction of an input signal. More particularly, the present invention relates to an apparatus and a method for correcting an antiphase component of an input signal.

BACKGROUND OF THE INVENTION

A vestigial sideband ("VSB") receiver is a high-definition television ("HDTV") receiver in the United States which has been proposed by the Advanced Television Systems Committee ("ATSC"). Many television receivers (including the VSB receiver) detect data with only a one-dimensional signal of an in-phase ("I") channel, whereas other demodulators demodulate a digital modulated signal. When the phase of the data signal received by a VSB receiver is not properly corrected, the decoding operation of the receiver is degraded.

Accordingly, a conventional phase correction circuit has been developed which includes an error tracking loop to overcome the problems described above. The correction circuit transforms a one-dimensional input signal into a two-dimensional signal (I) and (Q) by generating a quadrature ("Q") signal component to more accurately correct the phase of the input signal. Also, the correction circuit performs the phase correction operation on the input signal in a closed loop feedback manner using a decision error. The above phase correction circuit is described in the U.S. Pat. No. 5,406,587 which is assigned to Zenith Electronics Corporation and which is incorporated herein by reference.

The phase correction circuit or phase tracker disclosed in the above-referenced patent is illustrated in FIG. 1A, and includes a multiplier 22, a delay 24, a Hilbert transform filter 30, an adder 26, a complex multiplier 28, various look-up tables (32, 34, 42, 48, 50, 52) and other known components. The multiplier 22 controls the size of a one-dimensional input signal to produce a controlled input signal, and the delay 24 and Hilbert transform filter 30 transform the controlled input signal into a two-dimensional signal. The adder 26 removes a residual direct-current component of the input signal, and the complex multiplier 28 corrects the phase of the input signal and outputs a Q signal component of the input signal. One of the look-up tables detects a decision error component in the input signal for performing the phase correction operation, and other look-up tables output a corrected value based on the Q signal component output by the complex multiplier 28. The corrected value is fed back to the multiplier 28 and the adder in a closed loop in order to correct amplitude errors of the input signal.

When an input signal is a one-dimensional signal, the phase of the signal can be adjusted to either a normal phase or an antiphase. (See FIG. 1B). In such a situation, the I-channel data includes information which is actually transmitted, and the Q-channel data is not actually transmitted but serves to reduce a frequency spectrum of a modulated signal of the input signal. Accordingly, when a phase error is generated during the demodulation of the input signal, the I-channel sampling data includes both the I-channel data and the Q-channel data. Thus, the phase tracker also needs information relating to the Q-channel data in order to correct phase errors, and such information can be obtained by filtering the I-channel data via the Hilbert transform filter 30.

When the phase errors of a one-dimensional input signal are corrected using only an error component generated by decision, locking into an antiphase component necessarily occurs. Thus, every phase correction circuit that receives a one-dimensional input signal requires an additional process for antiphase correction. The phase tracker disclosed in the above-described patent application can solve the above problem because the antiphase state of the input signal is corrected if a constituent for obtaining a phase error component using a predetermined signal is additionally provided. However, in this case, the circuit configuration of the phase tracker is very complicated. Also, the phase tracker requires an excessive rotation with respect to a phase error of at least 90° and thus, causes a slow initial convergence speed. Furthermore, the multiplier described in the above-referenced patent may perform unstable automatic gain control ("AGC"), and therefore, the performance of the entire system may be deteriorated.

SUMMARY OF THE INVENTION

It is an object of the present invention to provide a circuit for correcting a phase error by removing an antiphase component in an input signal including a predetermined signal.

It is another object of the present invention to provide a phase correction circuit having simple hardware which determines whether or not the input of a one-dimensional signal has an antiphase relationship with respect to an phase-corrected signal by using the fact that a lock point of a loop exists in both a normal phase and an antiphase.

It is still another of the present invention to provide a method for correcting a phase error by removing an antiphase component in an input signal including a predetermined signal.

It is yet another object of the present invention to provide a phase correction method whereby a rapid initial convergence characteristic can be obtained by determining whether or not the input of a one-dimensional signal has an antiphase relationship with respect to an phase-corrected signal by using the fact that a lock point of a loop exists in both of a normal phase and an antiphase.

In order to achieve the above and other objects, a phase correction circuit is provided. The circuit comprises: a phase tracker which detects a decision error in a one-dimensional input signal having a phase error and which outputs a phase-corrected signal in response to said decision error; an antiphase detector which detects whether or not said phase-corrected signal is in antiphase and which outputs a corresponding phase control signal; and an antiphase corrector which corrects a phase of said phase-corrected signal in accordance with said phase control signal.

In order to further achieve the above and other objects, a phase correction method is provided. The method comprises the steps of: (a) detecting a decision error in a one-dimensional input signal having a phase error and outputting a phase-corrected signal in response to said decision error; (b) detecting whether or not said phase-corrected signal is in antiphase and outputting a corresponding phase control signal; and (c) correcting said phase-corrected signal in accordance with said phase control signal.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE PREFERRED EMBODIMENT(S)

The following description of the preferred embodiments discloses specific circuit configurations, components, values, etc. However, the preferred embodiments are merely examples of the present invention, and thus, the specific components and values described below are only used to more easily describe such embodiments and to provide an overall understanding of the present invention. Accordingly, one skilled in the art will readily recognize that the present invention is not limited to the specific components and values described below. Furthermore, the descriptions of various features and structures of the present invention which would have been known to one skilled in the art are omitted for the sake of clarity and brevity.

Figure 1A:
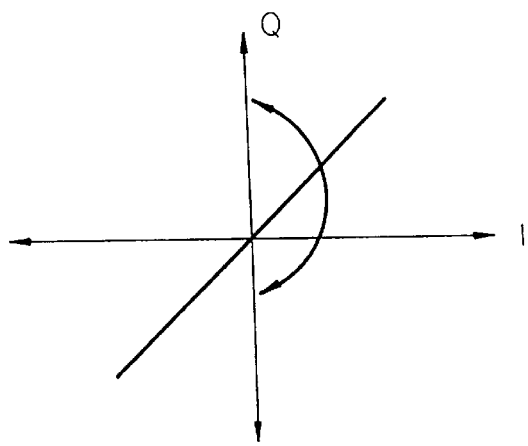
FIG. 1A shows an graphical example of the generation of an antiphase component.
Figure 2:
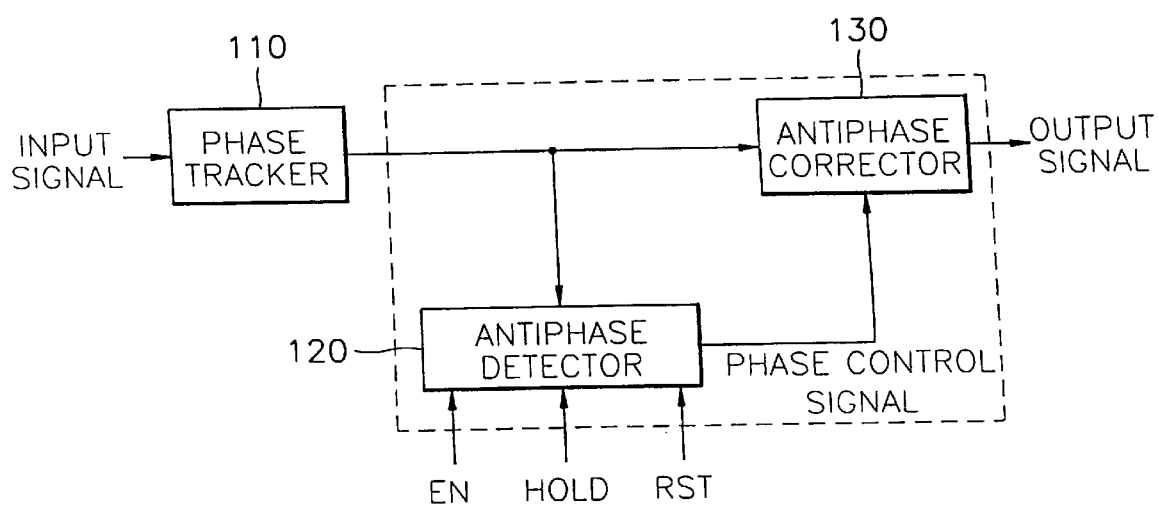
FIG. 2 is a block diagram of a phase correction circuit according to an embodiment of the present invention.
Figure 1B:
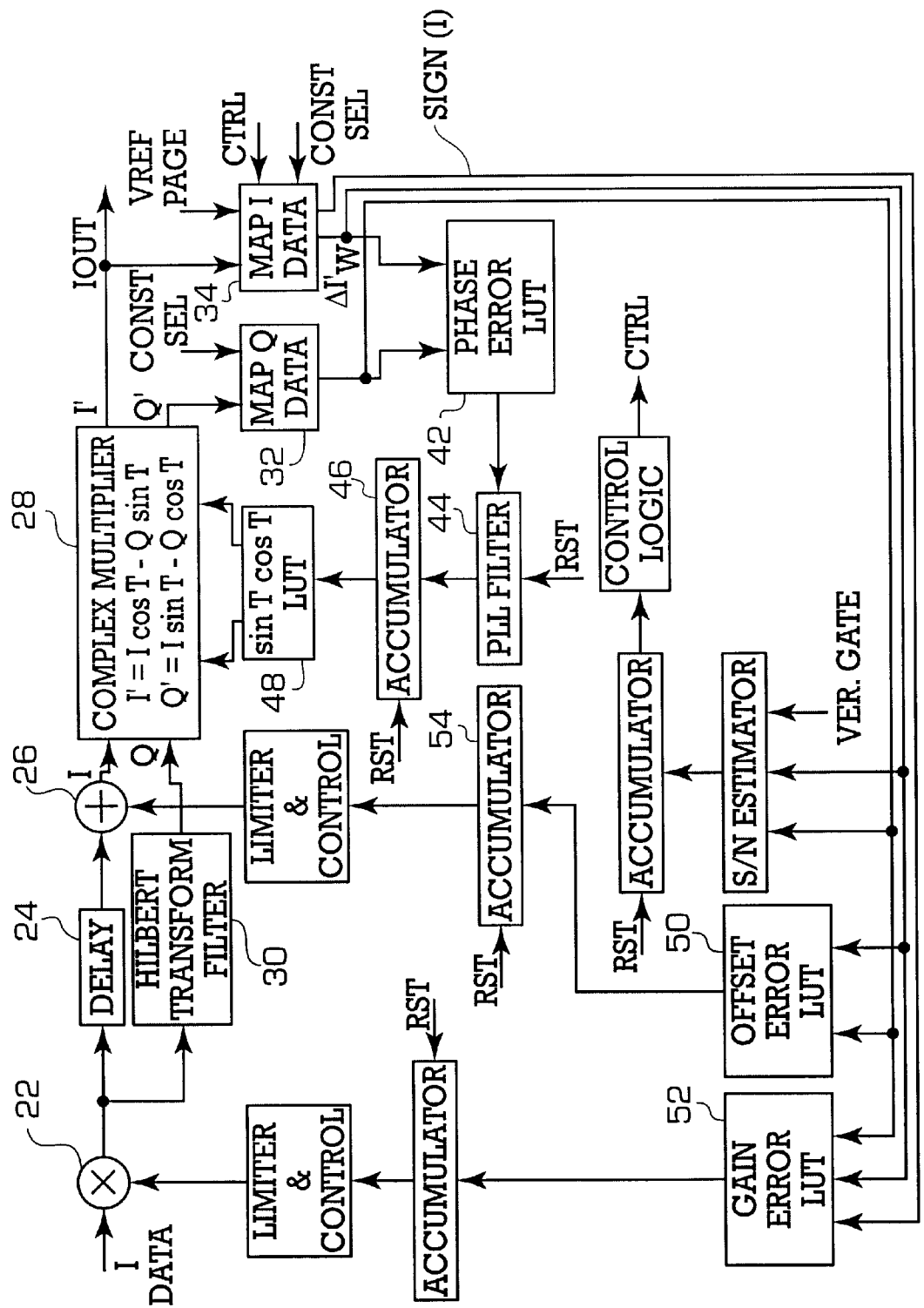
FIG. 1B shows a schematic diagram of a conventional phase tracker.

FIG. 2 shows an example of a phase correction circuit according to one embodiment of the present invention. The circuit includes a phase tracker 110, an antiphase detector 120, and an antiphase corrector 130. The phase tracker 110 receives a one-dimensional input signal having a phase error and detects a decision error in the input signal. If the input signal relates to VSB data, a decision error may occur in the following manner. VSB data comprises eight levels –7, –5, –3, –1, +1, +3, +5, and +7, and when a value of VSB data is received, the level to which such value corresponds must be determined. For example, if a value of VSB data equals 6.1, it may be decided that the value corresponds to the level +7. However, if the value actually corresponds to the level +5, a decision error is deemed to have occurred.

After determining if a decision error exists, the phase tracker 110 corrects the phase error in the input signal based on the detected decision error and outputs a corresponding phase-corrected signal. The antiphase detector 120 inputs the phase-corrected signal and determines whether or not such signal has been corrected by adjusting the phase of the input signal to an antiphase. Then, the detector 120 outputs a phase control signal in accordance with such determination. The antiphase corrector 130 inputs the phase-corrected signal from the phase tracker 110 and the phase control signal from the antiphase detector 120. Then, the corrector 130 corrects the phase of the phase-corrected signal according to the phase control signal.

In the embodiment shown in FIG. 2, any phase tracker can be used as the phase tracker 110 if it is configured to correct the phase of a one-dimensional input signal. Also, the phase tracker disclosed in an embodiment of U.S. Pat. No. 5,406,587 mentioned above can also be applied. Such patent is incorporated herein by reference.

Figure 3:
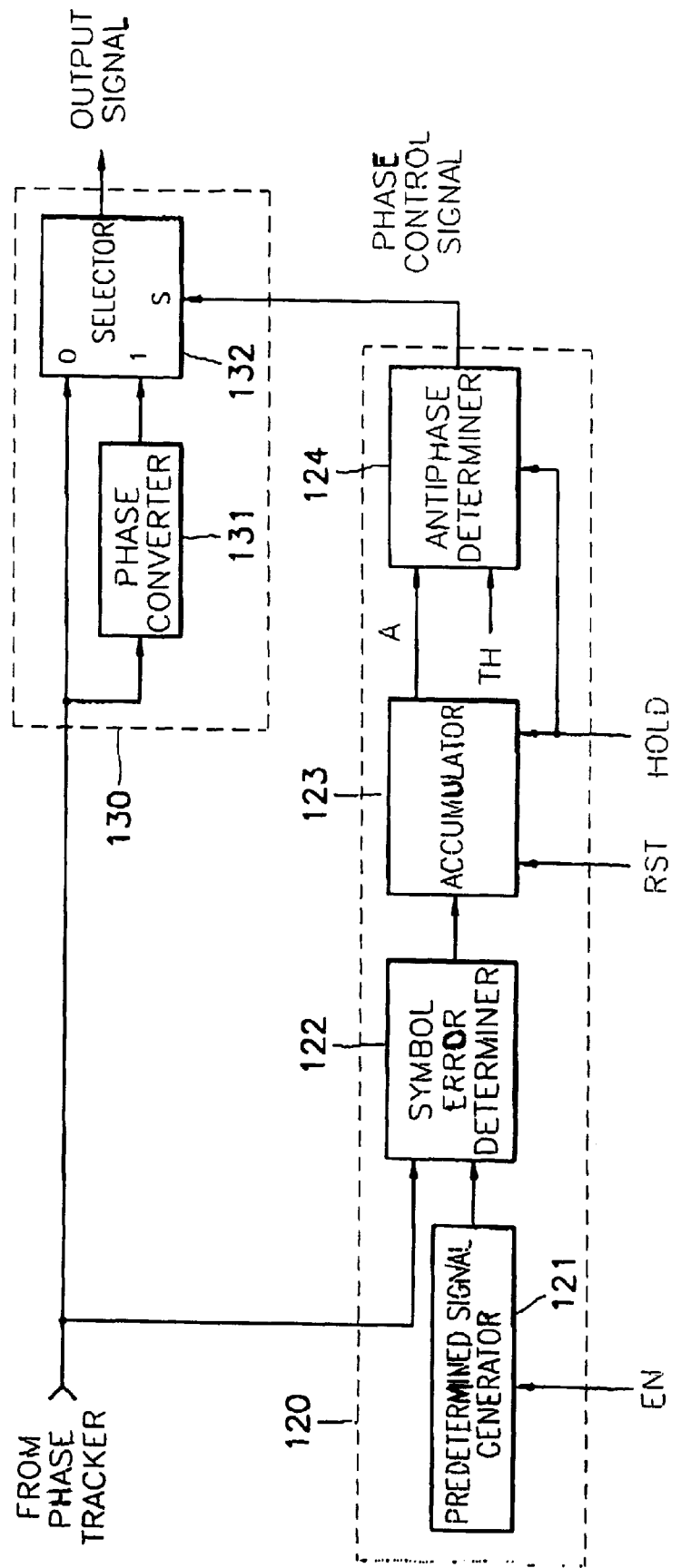
FIG. 3 is a detailed block diagram of the antiphase detector and the antiphase corrector shown in FIG. 2.

An example of the detailed configuration of the antiphase detector 120 and the antiphase corrector 130 is shown in FIG. 3. The antiphase detector 120 comprises a predetermined signal generator 121, a symbol error determiner 122, an accumulator 123, and an antiphase determiner 124. The predetermined signal generator 121 inputs and is driven by a timing signal EN having a first predetermined period which corresponds to the period of a predetermined signal of an input signal. When the timing signal EN is active, the generator 121 generates a predetermined output signal while the timing signal EN is active. The predetermined signal generator 121 may comprise a logic circuit or a memory (e.g. a ROM, RAM, etc.) which outputs the predetermined output signal s in response to the timing signal EN. Also, when the input signal is a VSB signal, the predetermined output signal can be a field synchronous signal contained in the field synchronous segment of a data frame of the VSB signal. The first predetermined period can be a period corresponding to a 511 pseudo number ("PN") period within the field synchronous segment. In addition, the data frame of the VSB signal comprises two fields, and a field synchronous signal indicating the start of each field is inserted into the field synchronous segment (i.e. the first segment) in each of the two fields. The field synchronous signal has a sequence of an uniform shape so that it can be used as the predetermined output signal.

The symbol error determiner 122 inputs the phase-corrected signal from the phase tracker 110 and the predetermined output signal from the predetermined signal generator 121. Then, the determiner 122 processes such signals to determine if the symbol of the phase-corrected signal has a symbol error. As an example, the data in the input signal may be determined to correspond to the level +7 using Q-channel information in the phase tracker, but the actual level of the data may correspond to the level –7. As a result, the phase of the phase-corrected symbol output by the phase tracker may be erroneous, and thus, the symbol is deemed to have a symbol error. In a simple configuration, the determiner 122 may comprise an exclusive OR ("EOR") gate which inputs the sign bit of the predetermined output signal and the most significant bit of the phase-corrected signal and performs an EOR operation on such signals to produce a processed signal. The processed signal equals a logic "1" if the symbol of the phase-corrected signal is an error and equals a logic "0" if the symbol is not an error.

Figure 4A:
FIG. 4A is a timing diagram of the timing signal input to the antiphase detector shown in FIG. 3.
Figure 4B:
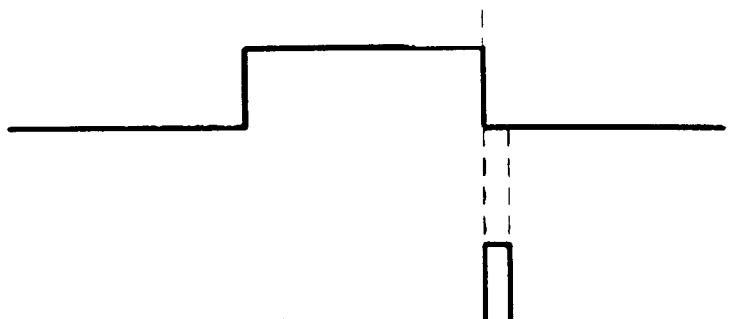
FIG. 4B is a timing diagram of the hold signal input to the antiphase detector shown in FIG. 3.
Figure 4C:
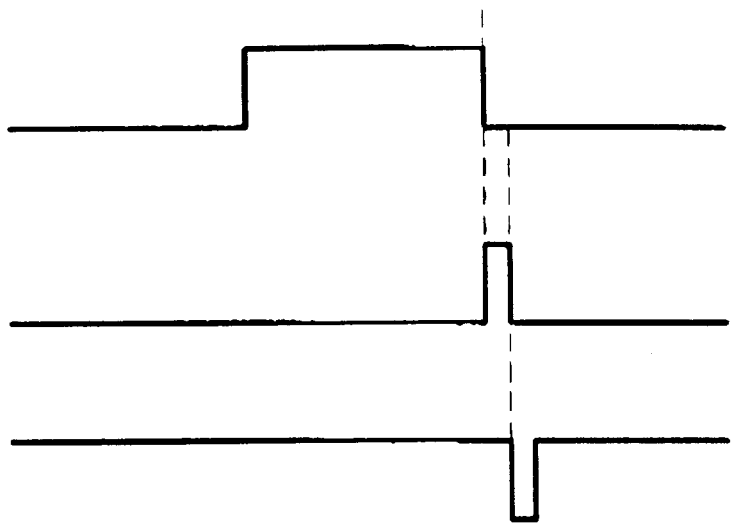
FIG. 4C is a timing diagram of the reset signal input to the antiphase detector shown in FIG. 3.

The processed signals sequentially output from the symbol error determiner 122 are accumulated in the accumulator 123 while the timing signal EN is active. FIG. 4A illustrates an example of the waveform of the timing signal EN and shows that the signal EN is active during a comparison period in which the signal EN is a logic "1". The accumulator 123 inputs a is hold signal HOLD shown in FIG. 4B and inputs a reset signal RST shown in FIG. 4C. The hold signal HOLD is an active high signal and becomes a logic "1" at the falling edge of the timing signal EN. Also, the reset signal RST is an active low signal and becomes a logic "0" at the falling edge of the hold signal HOLD. The accumulator 123 outputs an accumulated value A of the accumulated processed signals in accordance with the hold signal HOLD and resets the value A based on the reset signal RST.

The antiphase determiner 124 inputs the value A from the accumulator, inputs a threshold value TH, and outputs the phase control signal indicating whether or not the phase of the phase-corrected signal is correct based on the values A and TH. In the simplest configuration, the determiner 124 may comprise a comparator which compares the value A with the threshold value TH, outputs a logic "1" as the phase control signal when the value A is greater than the value TH, and outputs a logic "0" when the value A is less than or equal to the value TH. In the circuit described above, the symbol error determiner 122, the accumulator 123, and the antiphase determiner 124 can be referred to as a comparing portion.

As shown in FIG. 3, the antiphase corrector 130 comprises a phase converter 131 and a selector 132. The phase converter 131 inputs the phase-corrected signal and outputs an antiphase signal which is antiphase to the phase-corrected signal. The selector 132 inputs the phase control signal from the antiphase detector 120, the phase-corrected signal from the phase tracker 110, and the antiphase signal from the phase is converter 131. Then, the selector 132 selectively outputs the phase-corrected signal or the antiphase signal based on the phase control signal. The selector 132 may comprise a multiplexer which outputs the phase-corrected signal when the phase control signal equals a logic "0" and which outputs the antiphase signal when the phase control signal equals a logic "1". Also, the phase converter 131 may comprise an inverter which inputs the phase-corrected signal and outputs the antiphase signal by mathematically multiplying the phase-corrected signal by "−1".

In order to obtain a reliable phase control signal, the antiphase determiner 124 should change the value of the phase control signal only after the phase of the phase-corrected signal has changed and has consistently remained as a normal phase or antiphase for a second predetermined period (e.g. for N field periods). In other cases, the phase control signal maintains its previous value, and thus, the reliability of the antiphase detector 120 is improved.

Figure 5:
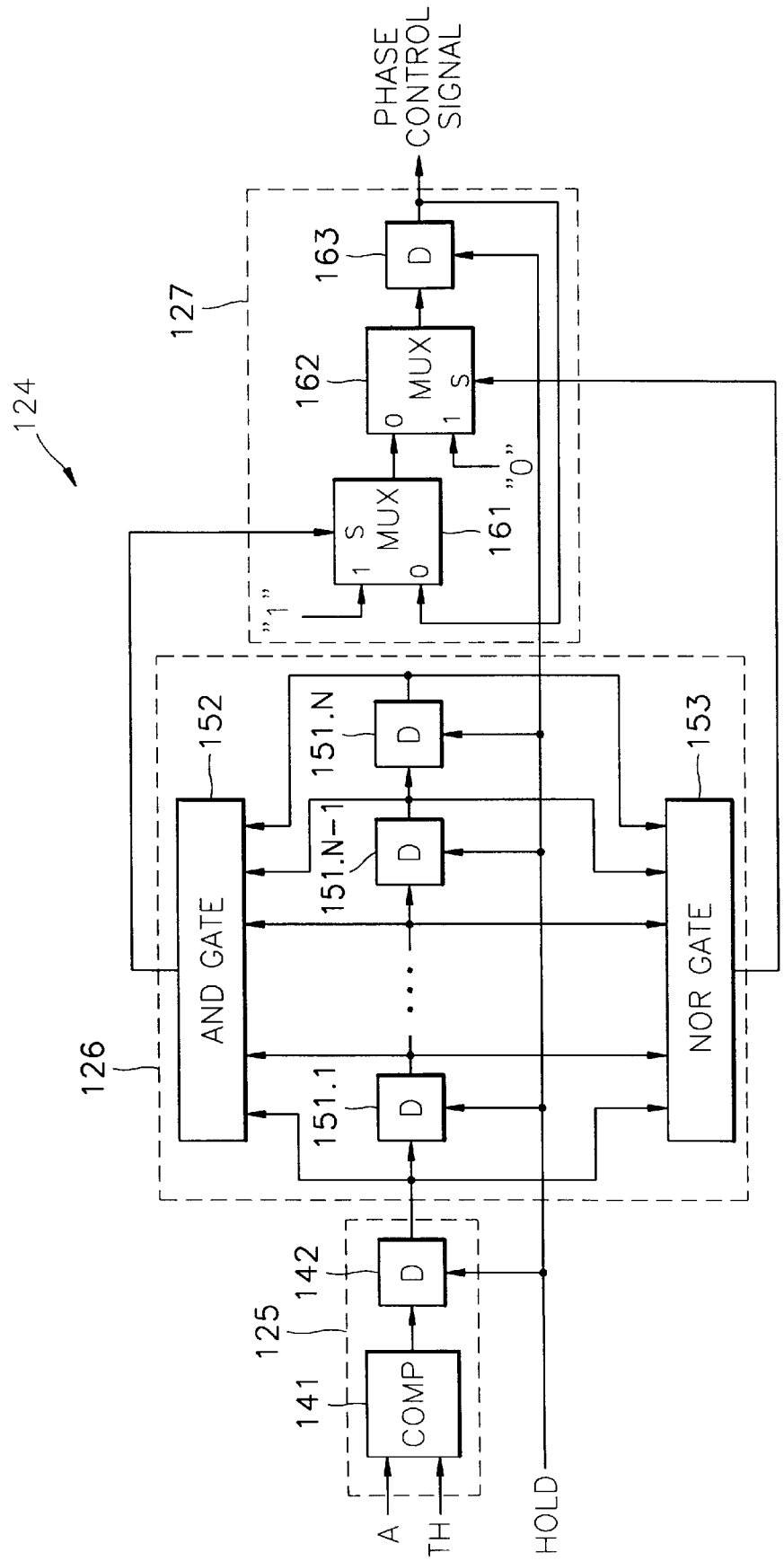
FIG. 5 is a detailed circuit diagram of the antiphase determiner shown in FIG. 3.

FIG. 5 is an example of a detailed circuit diagram of the antiphase determiner 124. As shown in the figure, the determiner 124 comprises a comparing circuit 125, a consistency detection circuit 126, and a selection circuit 127. The comparing circuit 125 compares the value A accumulated in the accumulator 123 with the threshold value TH and generates a comparison signal having a logic "1" or a logic "0" based on the comparison. Then, the comparison signal is latched based on the hold signal HOLD. The consistency detection circuit 126 determines whether or not the comparison signal generated by the comparing circuit 125 is maintained at a consistent value for the second predetermined period (i.e. for N field periods) and outputs selection control signals based on the determination. The selection circuit 127 selectively outputs a phase control signal having a particular value based on the selection control signals. For example, if the value of comparison signal changes from a first value to a second value and remains constant for N field periods, the consistency detection circuit 126 instructs the selection circuit 127 to output a phase control signal that corresponds to the second value of the comparison signal. On the other hand, if the value of comparison signal changes from a first value to a second value and remains constant for less than N field periods and switches back to the first value, the detection circuit 126 instructs the selection circuit 127 to continuously output a phase control signal that corresponds to the first value of the comparison signal.

As shown in FIG. 5, the comparing circuit 125 comprises a comparator 141 and a D flip-flop 142. The comparator 141 inputs the accumulation value A and the threshold value TH, compares the two values A and TH, and outputs the comparison signal based on such comparison. Then, the D flip-flop 142 latches and holds the comparison signal based on the hold signal HOLD.

The consistency detection circuit 126 comprises N D flop-flops 151.1 to 151.N, an AND gate 152, and a NOR gate 153. The flip-flops 151.1 to 151.N are connected in series and sequentially latch the comparing signals output from the comparing circuit 125 in accordance with the hold signal HOLD. The AND gate 152 inputs the output signals from the flip-flops 151.1 to 151.N, performs an AND operation on the output signals, and generates a first selection control signal. Similarly, the NOR gate 153 inputs the output signals from the flip-flops 151.1 to 151.N, performs a NOR operation on the output signals, and generates a second selection control signal.

The selection circuit 127 comprises a first multiplexer 161, a second multiplexer 162, and a D flip-flop 163. The first multiplexer 161 inputs the phase control signal via its first input, inputs a logic "1" via its second input, and inputs the first selection control signal from the AND gate 152 via its selection input. Then, the multiplexer 161 selectively outputs either the logic "1" or the phase control signal as a first selected signal based on the first selection control signal. The second multiplexer 162 inputs first selected signal via its first input, inputs a logic "0" via its second input, and inputs the second selection control signal from the NOR gate 153 via its selection input. Then the multiplexer 162 selectively outputs either the logic "0" or the first selected signal as a second selected signal based on the second selection control signal. The D flip-flop 163 inputs the second selected signal and latches the second selected signal as the phase control signal according to the hold signal HOLD.

Based on the above configuration, the determiner 124 compares the accumulated value A with the threshold value TH to generate the comparison signal and outputs the comparison signal as the phase control signal only when the previous N comparison signals are all logic "0" or all logic "1". Specifically, the comparing circuit 125 compares the accumulated value A with the threshold value TH, outputs a logic "1" as the comparison signal when the value A is greater than the threshold signal TH, and outputs a logic "0" as the comparison signal when the value A is less than or equal to the threshold signal TH. The D flip-flops 151.1 to 151.N perform a continuous shift operation on the comparison signals output from the comparing circuit 125 in accordance with the hold signal HOLD.

The AND gate 152 outputs a logic "1" as the first selection control signal only when all of the outputs of the D flip-flops 151.1 to 151.N are logic "1" (i.e. only when N consecutive comparison signals output from the comparing circuit 125 equal logic "1"). On the other hand, the NOR gate 153 outputs a logic "1" as the second selection control signal only when all of the outputs of the D flip-flops 151.1 to 151.N are logic "0" (i.e. only when N consecutive comparison signals output from the comparing circuit 125 equal logic "0").

When the accumulated value A is greater than the threshold value TH for N consecutive comparisons, the first selection control signal output from the AND gate 152 equals logic "1", and the second selection control signal output from the NOR gate 153 equals logic "0". Accordingly, the first multiplexer 161 selectively outputs the logic "1" as the first selected output, and the second multiplexer 162 selectively outputs the first selected output as the second selected output. In other words, the second selected output equals logic "1" and is latched by the D flip-flop 163 as the phase control signal. The phase control signal (i.e. a logic "1") is applied to the selector 132 (FIG. 3), and the selector 132 selectively outputs the antiphase signal from the phase converter 131.

When the accumulated value A is less than or equal to the threshold value TH for N consecutive comparisons, the first selection control signal output from the AND gate 152 equals logic "0", and the second selection control signal output from the NOR gate 153 equals logic "1". Accordingly, the first multiplexer 161 selectively outputs the phase control signal output from the flip-flop 163 as the first selected output, and the second multiplexer 162 selectively outputs the logic "0" as the second selected output. Thus, the second selected output equals logic "0" and is latched by the D flip-flop 163 as the phase control signal. The phase control signal (i.e. a logic "0") is applied to the selector 132 (FIG. 3), and the selector 132 selectively outputs the phase-corrected signal from the phase tracker 110.

When the accumulated value A is not less than or equal to the threshold value TH for N consecutive comparisons and is not greater than the threshold value TH for N consecutive comparisons, the first selection control signal output from the AND gate 152 equals logic "0", and the second selection control signal output from the NOR gate 153 equals logic "0". Thus, the first multiplexer 161 selectively outputs the phase control signal output from the flip-flop 163 as the first selected output, and the second multiplexer 162 selectively outputs the first selected output as the second selected output. Therefore, the second selected output equals the phase control signal currently output from the flip-flop 163 and is again latched by the D flip-flop 163 in accordance with the hold signal HOLD. Therefore, when the phase control signal is applied to the selector 132 (FIG. 3), the selector 132 continues to output either the phase-corrected signal from the phase tracker 110 or the antiphase signal from the phase converter 131.

Clearly, one skilled in the art will readily realize that many different hardware configurations can be used to generate a phase control signal which are alternatives or modifications to the circuit shown in FIG. 5. Also, the antiphase determiner 124 can be implemented via software in a microprocessor to generate a phase control signal rather than via hardware.

As described above, the present invention is able to detect whether or not the phase-corrected signal is in antiphase and can correct the antiphase signal so that it is a phase-corrected signal. Moreover, the present invention can obtain a rapid phase convergence with a relatively simple hardware (or software) configuration.

The previous description of the preferred embodiments is provided to enable a person skilled in the art to make or use the present invention. Moreover, various modifications to these embodiments will be readily apparent to those skilled in the art, and the generic principles defined herein may be applied to other embodiments without the use of inventive faculty. Therefore, the present invention is not intended to be limited to the embodiments described herein but is to be accorded the widest scope as defined by the claims.

What is claimed is:

1. A phase correction circuit comprising:
   a phase tracker which detects a decision error in a one-dimensional input signal having a phase error by processing both I and Q components derived from said input signal, and which outputs a phase-corrected signal in response to said decision error;
   an antiphase detector which detects whether or not said phase-corrected signal is in antiphase and which outputs a corresponding phase control signal; and
   an antiphase corrector which corrects a phase of said phase-corrected signal in accordance with said phase control signal.

2. The phase correction circuit as claimed in claim 1, wherein said antiphase detector comprises:
   a predetermined signal generator for generating a predetermined signal; and
   a comparator circuit which compares said predetermined signal with said phase-corrected signal, detects if said phase-corrected signal is in antiphase based on a relationship between said predetermined signal and said phase-corrected signal, and outputs said phase control signal.

3. A phase correction circuit comprising:
   a phase tracker which detects a decision error in a one-dimensional input signal having a phase error by processing both I and Q components derived from said input signal, and which outputs a phase-corrected signal in response to said decision error;
   an antiphase detector which detects whether or not said phase-corrected signal is in antiphase and which outputs a corresponding phase control signal; and
   an antiphase corrector which corrects a phase of said phase-corrected signal in accordance with said phase control signal;
   wherein said antiphase detector comprises:
      a predetermined signal generator for generating a predetermined signal;
      a symbol error determiner which determines if said phase-corrected signal contains a symbol error based on said predetermined signal and outputs a corresponding determination result;
      an accumulator which generates an accumulated value by accumulating said determination result during a first predetermined period and outputs said accumulated value; and
      an antiphase determiner which inputs said accumulated value, performs a determination of whether or not said accumulated value is consistently not greater than or consistently not less than a threshold value during a second predetermined period, and outputs said phase control signal in accordance with said determination.

4. The phase correction circuit as claimed in claim 3, wherein said symbol error determiner performs said determination by comparing a first predetermined bit of said predetermined signal with a second predetermined bit of said phase-corrected signal.

5. The phase correction circuit as claimed in claim 4, wherein said symbol error determiner comprises an EOR gate which inputs said first predetermined bit and said second predetermined bit and performs an EOR operation on said first predetermined bit and said second predetermined bit to produce an EORed signal.

6. The phase correction circuit as claimed in claim 3, wherein said first predetermined period is a period of a second predetermined signal within a field synchronous segment.

7. The phase correction circuit as claimed in claim 3, wherein said antiphase determiner comprises a comparator for performing a comparison of said accumulated value and said threshold value and generates said phase control signal based on said comparison.

8. The phase correction circuit as claimed in claim 3, wherein said antiphase determiner comprises:
   a comparing circuit which compares said accumulated value with said threshold value and which outputs a corresponding comparison signal;
   a consistency detection circuit which performs a detection operation to detect if a comparison signal value of said comparison signal is maintained at a consistent value during said second predetermined period; and a selection circuit which generates said phase control signal based on said detection operation, wherein said selection circuit outputs said phase control signal having a new value which equals said comparison signal value if said comparison signal value is consistently maintained during said second predetermined period and wherein said selection circuit outputs said phase control signal having said new value which equals a previous value of said phase control signal if said comparison signal value is not consistently maintained during said second predetermined period.

9. The phase correction circuit as claimed in claim 8, wherein said second predetermined period equals N field periods, wherein N is an integer.

10. The phase correction circuit as claimed in claim 9, wherein said consistency detection circuit comprises:

N flip-flops, connected in series to said comparing circuit which respectively latch previous comparison signal values as latched signals in accordance with a hold signal;

a first gate circuit which inputs said latched signals, detects if all of said latched signals are in a first logic state, and outputs a first selection control signal based on whether or not all of said latched signals are in said first logic state; and a second gate circuit which inputs said latched signals, detects if all of said latched signals are in a second logic state, and outputs a second selection control signal based on whether or not all of said latched signals are in said second logic state.

11. The phase correction circuit as claimed in claim 10, wherein said selection circuit comprises:

a first selector which inputs said phase control signal output from said selection circuit and a first predetermined logic value and selectively outputs said phase control signal or said first predetermined logic value as a first selected signal based on said first selection control signal; and a second selector which inputs said first selected signal and a second predetermined logic value and selectively outputs said first selected signal or said second predetermined logic value as a second selected signal based on said second selection control signal, wherein a value of said second selected signal equals said new value of said phase control signal.

12. The phase correction circuit as claimed in claim 11, wherein said selection circuit further comprises:

an output flip-flop which inputs said second selected signal and latches said second selected signal as said phase control signal in accordance with said hold signal.

13. The phase correction circuit as claimed in claim 3, wherein said antiphase determiner comprises a microprocessor which uses a software routine to compare said accumulated value with said threshold value and generate said phase control signal based on a relationship between said accumulated value and said threshold value.

14. A phase correction circuit comprising:

a phase tracker which detects a decision error in a one-dimensional input signal having a phase error by processing both I and Q components derived from said input signal, and which outputs a phase-corrected signal in response to said decision error;

an antiphase detector which detects whether or not said phase-corrected signal is in antiphase and which outputs a corresponding phase control signal; and an antiphase corrector which corrects a phase of said phase-corrected signal in accordance with said phase control signal;

wherein said antiphase corrector comprises:

a phase converter for adjusting said phase of said phase-corrected signal to produce an antiphase signal in antiphase to said phase-corrected signal; and a selector which selectively outputs either said phase-corrected signal or said antiphase signal based on said phase control signal.

15. The phase correction circuit as claimed in claim 3, wherein said symbol error determiner performs said determination by comparing a first predetermined bit of said predetermined signal with a second predetermined bit of phase-corrected signal.

16. The phase correction circuit as claimed in claim 15, wherein said symbol error determiner comprises a EOR gate which inputs said first predetermined bit and said second predetermined bit and performs an EOR operation on said first predetermined bit and said second predetermined bit to produce a EORed signal.

17. The phase correction circuit as claimed in claim 5, wherein said EOR gate outputs said EORed signal as said determined result.

18. The phase correction circuit as claimed in claim 16, wherein said EOR gate outputs said EORed signal as said determined result.

19. The phase correction circuit as claimed in claim 11, wherein said first logic state equals said first predetermined logic value and said second logic state equals said second predetermined logic value.

20. The phase correction circuit as claimed in claim 19, wherein said first logic state equals a logic "1" and said second logic state equals a logic "0", wherein said first gate circuit is an AND gate which outputs a logic "1" as said first selection control signal when all of said latched signals equal a logic "1", and wherein said second gate circuit is a NOR gate which outputs a logic "1" as said second selection control signal when all of said latched signals equal a logic "0".

21. The phase correction circuit as claimed in claim 20, wherein said first selector outputs said first predetermined logic value as said first selected signal when said first selection control signal equals a logic "1" and outputs said phase control signal as said first selected signal when said first selection control signal equals a logic "0", and wherein said second selector outputs said second predetermined logic value as said second selected signal when said second selection control signal equals a logic "1" and outputs said first selected signal as said second selected signal when said second selection control signal equals a logic "0".

22. A phase correction method comprising the steps of:

(a) detecting a decision error in a one-dimensional input signal having a phase error by processing both I and Q components derived from said input signal, and outputting a phase-corrected signal in response to said decision error;

(b) detecting whether or not said phase-corrected signal is in antiphase and outputting a corresponding phase control signal; and (c) correcting said phase-corrected signal in accordance with said phase control signal.

23. The phase correction method as claimed in claim 22, wherein said step (b) comprises the steps of:

(b1) generating a predetermined signal;

(b2) comparing said phase-corrected signal with said predetermined signal and determining if said phase-corrected signal is in antiphase based on a relationship between said predetermined signal and said phase-corrected signal; and
(b3) outputting said phase control signal in accordance with said relationship.

24. A phase correction method comprising the steps of:
(a) detecting a decision error in a one-dimensional input signal having a phase error by processing both I and Q components derived from said input signal, and outputting a phase-corrected signal in response to said decision error;
(b) detecting whether or not said phase-corrected signal is in antiphase and outputting a corresponding phase control signal; and
(c) correcting said phase-corrected signal in accordance with said phase control signal;
wherein said step (b) comprises the steps of:
  (b1) generating a predetermined signal;
  (b2) comparing said phase-corrected signal with said predetermined signal and determining if said phase-corrected signal is in antiphase based on a relationship between said predetermined signal and said phase-corrected signal; and
  (b3) outputting said phase control signal in accordance with said relationship; wherein in said step (b2) comprises the step of:
    (b2a) comparing a first predetermined bit of said phase-corrected signal with a second predetermined bit of said predetermined signal.

25. The phase correction method as claimed in claim 24, wherein said first predetermined bit is a most significant bit of said phase-corrected signal and said second predetermined bit is a sign bit of said predetermined signal.

26. The phase correction method as claimed in claim 22, wherein said step (b) comprises the steps of:
(b1) generating a predetermined signal; and
(b2) determining whether or not said phase-corrected signal is in antiphase by comparing said predetermined signal with said phase-corrected signal to detect whether or not said phase-corrected signal contains a symbol error.

27. The phase correction method as claimed in claim 24, wherein said step (b2a) comprises the steps of:
(b2a1) performing a EOR operation on said first predetermined bit and said second predetermined bit to produce a EORed signal; and
(b2a2) determining if said phase-corrected signal is in antiphase based on said EORed signal.

28. A phase correction method comprising the steps of:
(a) detecting a decision error in a one-dimensional input signal having a phase error by processing both I and Q components derived from said input signal, and outputting a phase-corrected signal in response to said decision error;
(b) detecting whether or not said phase-corrected signal is in antiphase and outputting a corresponding phase control signal; and
(c) correcting said phase-corrected signal in accordance with said phase control signal;
wherein said step (b) comprises:
  (b1) determining if said phase-corrected signal contains a symbol error by comparing a predetermined signal with said phase-corrected signal and outputting a corresponding determination result;
  (b2) producing an accumulated value by accumulating said determination result during a first predetermined period and outputting said accumulated value; and
  (b3) performing a determination of whether said accumulated value is consistently not greater than or consistently not less than a threshold value during a second predetermined period and outputting said phase control signal based on said determination.

29. The phase correction method as claimed in claim 28, wherein said first predetermined period is a period of a second predetermined signal within a field synchronous segment.

30. The phase correction method as claimed in claim 28, wherein said step (b3) comprises:
(b3a) generating a comparison signal based on said determination;
(b3b) performing a detection operation to detect if a comparison signal value of said comparison signal is maintained at a consistent value during said second predetermined period; and
(b3c) outputting said phase control signal having a new value which equals said comparison signal value if said comparison signal value is consistently maintained at said consistent value during said second predetermined period and outputting said phase control signal having said new value which equals a previous value of said phase control signal if said comparison signal value is not consistently maintained at said consistent value during said second predetermined period.

31. The phase correction method as claimed in claim 30, wherein said second predetermined period equals N field periods, wherein N is an integer.

32. The phase correction method as claimed in claim 31, wherein said step (b3b) comprises the steps of:
(b3b1) sequentially latching N previous comparison signal values as latched signals in accordance with a hold signal;
(b3b2) determining if all of said latched signals are in a first logic state and outputting a first selection control signal based on whether or not all of said latched signals are in said first logic state; and
(b3b3) determining if all of said latched signals are in a second logic state and outputting a second selection control signal based on whether or not all of said latched signals are in said second logic state.

33. The phase correction method as claimed in claim 32, wherein said step (b3c) comprises the steps of:
(b3c1) inputting said phase control signal and a first predetermined logic value and selectively outputting said phase control signal or said first predetermined logic value as a first selected signal based on said first selection control signal; and
(b3c2) inputting said first selected signal and a second predetermined logic value and selectively outputting said first selected signal or said second predetermined logic value as a second selected signal based on said second selection control signal,
wherein a value of said second selected signal equals said new value of said phase control signal.

34. The phase correction method as claimed in claim 33, wherein said step (bc3) further comprises the step of:
(b3c3) latching said second selected signal as said phase control signal in accordance with said hold signal.

* * * * *